US011296913B2

(12) United States Patent
Noh et al.

(10) Patent No.: US 11,296,913 B2
(45) Date of Patent: *Apr. 5, 2022

(54) METHOD AND APPARATUS FOR TRANSMITTING ACK/NACK

(71) Applicant: Electronics and Telecommunications Research Institute, Daejeon (KR)

(72) Inventors: Taegyun Noh, Daejeon (KR); Jae Young Ahn, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,858

(22) Filed: Jul. 13, 2020

(65) Prior Publication Data
US 2020/0344098 A1    Oct. 29, 2020

Related U.S. Application Data

(60) Continuation of application No. 16/174,346, filed on Oct. 30, 2018, now Pat. No. 10,749,722, and a
(Continued)

(30) Foreign Application Priority Data

Aug. 19, 2008    (KR) .................. 10-2008-0081083
Sep. 26, 2008    (KR) .................. 10-2008-0094491
(Continued)

(51) Int. Cl.
*H04W 4/00*     (2018.01)
*H04L 27/26*    (2006.01)
(Continued)

(52) U.S. Cl.
CPC ........ *H04L 27/2607* (2013.01); *H04L 1/1893* (2013.01); *H04L 5/0048* (2013.01);
(Continued)

(58) Field of Classification Search
CPC ... H04L 5/0053; H04L 5/0023; H04L 5/0048; H04L 5/0055; H04L 5/0007; H04L 5/001;
(Continued)

(56) References Cited

U.S. PATENT DOCUMENTS 7,969,943 B2 *  6/2011  Miki ..................... H04L 1/1854
                                             370/208
8,204,010 B2    6/2012  Suzuki et al.
(Continued)

FOREIGN PATENT DOCUMENTS

EP          1764943 A1    3/2007
KR    10-2006-0016723 A   2/2006
(Continued)

OTHER PUBLICATIONS

Samsung; "Clarification on Mapping of Cyclic Shift Field in DCI format 0", 3GPP TSG-RAN Working Group 1 #53bis, Warsaw, Poland, Jun. 30-Jul. 4, 2008; R1-082302; 3 pages.
(Continued)

*Primary Examiner* — Thai D Hoang

(57) ABSTRACT

A technology enabling a terminal to receive acknowledgement (ACK)/negative ACK (NACK) information about data transmitted from the terminal is provided. The method includes receiving cyclic shift information for a reference signal from the base station; transmitting, to the base station, the data and a reference signal which is cyclic-shifted using a cyclic shift value, the cyclic shift value being determined based on a dynamic cyclic shift value mapped one-to-one to the cyclic shift information for the reference signal; and receiving, from the base station, the ACK/NACK information about the transmitted data through a radio resource of a downlink channel, the radio resource of the downlink channel being identified based on a modifier mapped one-to-one to the cyclic shift information for the reference signal.

18 Claims, 6 Drawing Sheets

Related U.S. Application Data division of application No. 15/428,578, filed on Feb. 9, 2017, now Pat. No. 10,148,477, which is a continuation of application No. 13/658,282, filed on Oct. 23, 2012, now Pat. No. 9,602,260, which is a continuation of application No. 12/652,210, filed on Jan. 5, 2010, now Pat. No. 8,320,337, which is a continuation of application No. PCT/KR2009/004616, filed on Aug. 19, 2009.

(30) Foreign Application Priority Data

| Oct. 17, 2008 | (KR) | .................. | 10-2008-0101970 |
| May 29, 2009 | (KR) | .................. | 10-2009-0047517 |

(51) Int. Cl.
- H04L 1/18 (2006.01)
- H04L 5/00 (2006.01)
- H04W 74/08 (2009.01)

(52) U.S. Cl.
CPC .......... H04L 5/0053 (2013.01); H04L 5/0055 (2013.01); H04W 74/085 (2013.01)

(58) Field of Classification Search
CPC ... H04L 5/0091; H04L 5/0037; H04L 5/0094; H04L 1/1861; H04L 1/1893; H04L 1/1854; H04L 1/0026; H04L 1/1671; H04L 1/1692; H04L 27/2607; H04W 72/00; H04W 72/04; H04W 72/042; H04W 72/0406; H04W 72/0446; H04W 72/0413; H04W 72/1268; H04W 72/0493; H04W 27/2607; H04W 74/085; H04B 7/40413; H04B 7/0606; H04B 7/0613; H04B 7/063; H04B 7/0626; H04B 7/0639; H04B 7/0452; H04J 13/0062; H04J 13/0003; H04J 13/00; H04J 13/18
USPC ................ 370/208–210, 329–330, 335–338, 370/341–345, 347–349; 455/450–454; 375/260–262
See application file for complete search history.

(56) References Cited

U.S. PATENT DOCUMENTS

| 8,320,337 | B2 | 11/2012 | Noh et al. |
| 8,514,783 | B2 | 8/2013 | Lee |
| 8,531,962 | B2 | 9/2013 | Chen et al. |
| 9,001,771 | B2 | 4/2015 | Jongren |
| 9,602,260 | B2 | 3/2017 | Noh et al. |
| 10,148,477 | B2 | 12/2018 | Noh et al. |
| 10,749,722 | B2* | 8/2020 | Noh ...................... H04L 5/0048 |
| 2007/0002726 | A1 | 1/2007 | Zangi |
| 2007/0171995 | A1 | 7/2007 | Muharemovic et al. |
| 2007/0183386 | A1 | 8/2007 | Muharemovic et al. |
| 2008/0075184 | A1* | 3/2008 | Muharemovic ....... H04L 1/1854 375/260 |
| 2008/0298433 | A1* | 12/2008 | Tiirola ................ H04J 13/0062 375/132 |
| 2008/0311942 | A1* | 12/2008 | Kim ...................... H04L 1/1854 455/509 |
| 2009/0092148 | A1* | 4/2009 | Zhang .................. H04L 5/0055 370/458 |
| 2009/0196238 | A1* | 8/2009 | Cheng .................. H04L 1/0027 370/329 |
| 2009/0196240 | A1* | 8/2009 | Frederiksen .......... H04L 1/1607 370/329 |
| 2009/0232067 | A1 | 9/2009 | Pajukoski |
| 2009/0245194 | A1* | 10/2009 | Damnjanovic ....... H04L 1/1607 370/329 |
| 2009/0257408 | A1 | 10/2009 | Zhang et al. |
| 2009/0268685 | A1 | 10/2009 | Chen |
| 2010/0041350 | A1 | 2/2010 | Zhang |
| 2010/0173625 | A1* | 7/2010 | Noh ...................... H04L 1/1893 455/422.1 |
| 2010/0173641 | A1* | 7/2010 | Kim ...................... H04L 5/0026 455/450 |
| 2010/0177804 | A1 | 7/2010 | Kwak et al. |
| 2010/0202378 | A1 | 8/2010 | Youn et al. |
| 2010/0226413 | A1 | 9/2010 | Muharemovic et al. |
| 2010/0232378 | A1* | 9/2010 | Imamura ............... H04L 1/1854 370/329 |
| 2010/0296452 | A1 | 11/2010 | Futagi et al. |
| 2011/0019529 | A1 | 1/2011 | Wang et al. |
| 2011/0051621 | A1 | 3/2011 | Kwak et al. |
| 2011/0116465 | A1* | 5/2011 | Miki .................. H04W 72/1215 370/329 |
| 2011/0243066 | A1 | 10/2011 | Nayeb Nazar |
| 2011/0317596 | A1 | 12/2011 | Jongren |
| 2012/0033561 | A1* | 2/2012 | Kawamura ............. H04J 13/14 370/252 |
| 2012/0163318 | A1 | 6/2012 | Kishiyama |
| 2012/0170683 | A1 | 7/2012 | Frederiksen |
| 2012/0263124 | A1 | 10/2012 | Gaal |
| 2012/0327886 | A1 | 12/2012 | Yu |
| 2013/0064169 | A1 | 3/2013 | Song |
| 2013/0155992 | A1 | 6/2013 | Yoon |
| 2013/0223397 | A1 | 8/2013 | Kim |

FOREIGN PATENT DOCUMENTS

| WO | 02/01743 A1 | 1/2002 |
| WO | 2007/087602 A2 | 8/2007 |
| WO | 2008/036977 A2 | 3/2008 |

OTHER PUBLICATIONS

3rd Generation Partnership Project: "Physical Channels and Modulation (Release 8)", Technical Specification Group Radio 3GPP, Evolved Universal Terrestrial Radio Accesss (E-UTRA); May 2008, 82 pages.
Qualcomm Europe; "Mapping of PHICH Resources from PUSCH and DM-RS Transmission", 3GPP TSG-RAN WG1 #53; R1-081961; May 5-9, 2008, Kansas City, USA, pp. 1-6.
Samsung; "Clarification on Mapping of Cyclic Shift Field in DCI format 0", 3GPP TSG-RAN Working Group 1 #53bis; R1-082302; Warsaw, Poland, Jun. 30-Jul. 4, 2008; 4 pages.
Motorola; "PHICH Assignment in E-UTRA", 3GPP TSG RAN1 #51; R1-074588; Jeju, Korea, Nov. 5-9, 2007; 4 pages.
Non-final Office Action dated Mar. 2, 2012 for U.S. Appl. No. 12/652,210.
Notice of Allowance dated Jul. 23, 2012 for U.S. Appl. No. 12/652,210.
Non-final Office Action dated Jul. 11, 2014 for U.S. Appl. No. 13/658,282.
Final Office Action dated Dec. 12, 2014 for U.S. Appl. No. 13/658,282.
Advisory Action dated May 22, 2015 for U.S. Appl. No. 13/658,282.
Non-final Office Action dated Jul. 30, 2015 for U.S. Appl. No. 13/658,282.
Final Office Action dated Mar. 21, 2016 for U.S. Appl. No. 13/658,282.
Notice of Allowance dated Oct. 19, 2016 for U.S. Appl. No. 13/658,282.
Non-final Office Action dated Oct. 25, 2017 for U.S. Appl. No. 15/428,578.
Final Office Action dated Feb. 22, 2018 for U.S. Appl. No. 15/428,578.
Notice of Allowance dated Aug. 25, 2018 for U.S. Appl. No. 15/428,578.
R1-072991, Cyclic Shift Hopping and DM RS Signaling, 3GPP TSG RAN WG1 #49bis by Nokia ("R1-072991").
R1-074000, PDCCH Formats (A) for Scheduling Grants, TSG-RAN1 #50 bis, Motorola ("R1-074000").

(56) References Cited

OTHER PUBLICATIONS

R1-074002, PDCCH Formats (A) for Scheduling Grants, TSG-RAN1 #50 bis, Motorola ("R1-074002").
R1-080976, Implicit assignment of PHICH, TSG RAN WG1 # 52 ("R1-080976").
R1-080999, PHICH Linkage to Uplink Transmissions, TSG RAN WG1 # 52 ("R1-080999").
R1-080720, Cyclic Shift Values for UL RS, TSG RAN WG1 # 52 ("R1-080720").
R1-080776, PHICH Index Mapping for Uplink Transmission for E-UTRA, TSG-RAN WG1 Meeting # 52 ("R1-080776").
R1-080927, PHICH and mapping to PHICH groups, TSG RAN WG1 # 52 ("R1-080927").
R1-080674, Details of PHICH allocation, SG-RAN WG1 # 52; 3GPP TS 36.213 v8.2.0 ("R1-080674").
R1-081444, Cyclic shift value definition for PUSCH demodulation RS, 3GPP TSG RAN WG1 #52bis, by Nokia ("R1-081444").
R1-081961, Mapping of PHICH Resources from PUSCH and DM-RS Transmission, 3GPP TSG-RAN WG1 #53 by Qualcomm Europe ("R1-081961").
R1-082302, Clarification on Mapping of Cyclic Shift Field in DCI format 0, Jun. 30-Jul. 4, 2008, 3GPP TSG-RAN Working Group 1 #53bis, by Samsung ("R1-082302").
R1-082439, Issues with PHICH Modifier, Jun. 30-Jul. 4, 2008, 3GPP TSG RAN WG1#53bis, by LG Electronics ("R1-082439").
3GPP TS 36.211 V8.4.0 ("TS 36.211 V8.4.0").
3GPP TS 36.212 V8.4.0 ("TS 36.212 V8.4.0").
3GPP TS 36.213 V8.4.0 (Sep. 2008) ("TS 36.213 V8.4.0").
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits M-1 to M-4 to Defendant's Preliminary Invalidity Contentions submitted on Jul. 22, 2019 for Case No. 2:18-cv-00526 (E.D. Texas).
Appendix M to Defendant's Preliminary Invalidity Contentions submitted on Jul. 22, 2019 for Case No. 2:18-cv-00526 (E.D. Texas).
Andrews, George E. "Number theory, Saunders." (1971).
Non-final office action dated Feb. 26, 2019 for U.S. Appl. No. 16/174,346.
Final office action dated Sep. 6, 2019 for U.S. Appl. No. 16/174,346.
Notice of Allowance dated Feb. 3, 2020 for U.S. Appl. No. 16/174,346.
Notice of Allowance dated Jun. 17, 2020 for U.S. Appl. No. 16/174,346.
Complaint filed Mar. 17, 2021 in the Western District of Texas (Waco Division) for Case No. 6:21-cv-00270.
Declaration of Alexander Haimovich, Ph.D. submitted on Dec. 10, 2019 for IPR No. 2020-00237 under 37 C.F.R. §1.68.
Complaint filed Dec. 3, 2018 in Sol IP, LLC v. AT&T Mobility LLC, Civil Action No. 2:18-cv-00826 (E.D. Tex.).
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008) ("36.211 V8.4.0").
3rd Generation Partnership Project; Technical Specification Group Radio Access Network; Evolved Universal Terrestrial Radio Access (E-UTRA); Physical layer procedures (Release 8), 3GPP TS 36.213 V8.4.0 (Sep. 2008) ("36.213 V8.4.0").
LG Electronics, "Issues with PHICH Modifier," 3GPP TSG RAN WG1 Meeting #53bis in Warsaw, Poland, Jun. 30-Jul. 4, 2008, R1-082439.
Qualcomm Europe, "Mapping of PHICH Resources from PUSCH and DM-RS Transmission," 3GPP TSG RAN WG1 Meeting #53 in Kansas City, USA, May 5-9, R1-081961 ("Qualcomm-1").
3rd Generation Partnership Project; Technical Specification Group Radio Access Network; Evolved Universal Terrestrial Radio Access (E-UTRA); Physical Channels and Modulation (Release 8), 3GPP TS 36.211 V8.3.0 (May 2008).
3rd Generation Partnership Project; Technical Specification Group Radio Access Network; Evolved Universal Terrestrial Radio Access (E-UTRA); Physical layer procedures (Release 8), 3GPP TS 36.213 V8.3.0 (May 2008).
Declaration of Craig Bishop submitted on Dec. 10, 2019 for IPR No. 2020-00237 under 37 C.F.R. § 1.68 ("Bishop Decl.") and related appendices.
Motorola, "PDCCH Formats (A) for Scheduling Grants," 3GPP TSG RAN WG1 Meeting #50bis in Shanghai, China, Oct. 8-12, 2007, R1-074000.
Nokia Siemens Networks, Nokia, "Cyclic shift value definition for PUSCH demodulation RS," 3GPP TSG RAN WG1 Meeting #52bis in Shenzhen, China, Mar. 31-Apr. 4, 2008, R1-081444.
Samsung, "Clarification on Mapping of Cyclic Shift Field in DCI format 0," 3GPP TSG RAN WG1 #53bis in Warsaw, Poland, Jun. 30-Jul. 4, 2008, R1-082302.
ETRI, "PHICH resource identification for extended CP," 3GPP TSG RAN WG1 #55 in Prague, Czech Rep., Nov. 10-14, 2008, R1-084530.
3rd Generation Partnership Project; Technical Specification Group Radio Access Network; Evolved Universal Terrestrial Radio Access (E-UTRA); Physical Channels and Modulation (Release 8), 3GPP TS 36.211 V8.5.0 (Dec. 2008).
Plaintiff Sol IP's First Amended Infringement Contentions submitted on Mar. 22, 2019 for Sol IP, LLC v. AT&T Mobility LLC et al.
"Draft Report of 3GPP TSG RAN WG1 #50 v0.2.0," 3GPP TSG RAN WG1 #50bis in Shanghai, China, Oct. 8-12, 2007, R1-073896.
Motorola, "PHICH Assignment for MU-MIMO in E-UTRA," 3GPP TSG RAN WG1 #50bis in Shanghai, China, Oct. 8-12, 2007, R1-074002.
Samsung, "Summary of Offline Discussions on EUTRA UL RS," 3GPP TSG RAN WG1 Meeting #52bis in Shenzhen, China, Mar. 31-Apr. 4, 2008, R1-081662.
3rd Generation Partnership Project; Technical Specification Group Radio Access Network; Evolved Universal Terrestrial Radio Access (E-UTRA); Physical Channels and Modulation (Release 8), 3GPP TS 36.211 V8.0.0 (Sep. 2007).
Qualcomm Europe, "Structure of PBCH and Location of D-BCH," 3GPP TSG RAN WG1 #49bis in Orlando, USA, Jun. 25-29, 2007, R1-072728.
"Way forward on PHICH allocation," 3GPP TSG RAN WG1 #52 in Sorrento, Italy, Feb. 11-15, 2008, R1-081071.
3rd Generation Partnership Project; Technical Specification Group Radio Access Network; Evolved Universal Terrestrial Radio Access (E-UTRA); Physical Channels and Modulation (Release 8), 3GPP TS 36.211 V8.2.0 (Mar. 2008).
3rd Generation Partnership Project; Technical Specification Group Radio Access Network; Evolved Universal Terrestrial Radio Access (E-UTRA); Physical layer procedures (Release 8), 3GPP TS 36.213 V8.2.0 (Mar. 2008).
Qualcomm Europe, "Details of the UL Demodulation RS," 3GPP TSG RAN 1 #50 in Athens, Greece, Aug. 20-24, 2007, R1-073253.
Correspondence regarding consent to file infringement contentions under seal at the PTAB.
Petition for Inter Partes Review IPR 2020-00237 submitted on Dec. 10, 2019.
Notice of Termination for IPR2020-00237 entered Mar. 9, 2020.

* cited by examiner

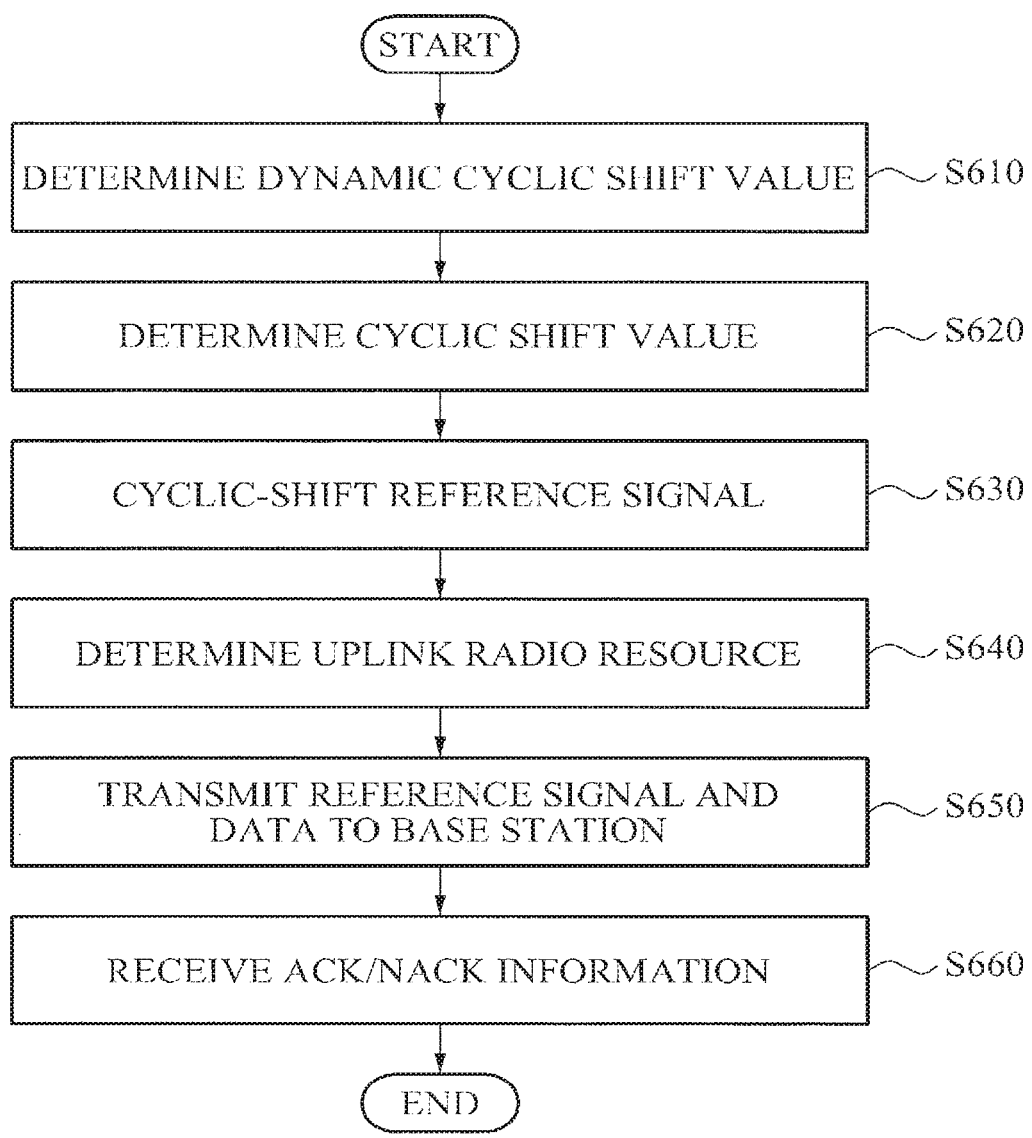

METHOD AND APPARATUS FOR TRANSMITTING ACK/NACK

This application is a continuation of U.S. patent application Ser. No. 16/174,346 filed on Oct. 30, 2018, which is a continuation of U.S. patent application Ser. No. 15/428,578 filed on Feb. 9, 2017, now U.S. Pat. No. 10,148,477, which is continuation of U.S. patent application Ser. No. 13/658,282 filed on Oct. 23, 2012, now U.S. Pat. No. 9,602,260, which is a continuation of U.S. patent application Ser. No. 12/652,210 filed on Jan. 5, 2010 now U.S. Pat. No. 8,320,337, which is a continuation of International Application No. PCT/KR2009/004616 filed on Aug. 19, 2009, which claims the benefit of Korean Application No. 10-2009-0047517 filed on May 29, 2009, Korean Application No. 10-2008-0101970 filed on Oct. 17, 2008, Korean Application No. 10-2008-0094491 filed on Sep. 26, 2008, and Korean Application No. 10-2008-0081083 filed on Aug. 19, 2008, in the Korean Intellectual Property Office, the disclosures of which are hereby incorporated by reference.

TECHNICAL FIELD

The present invention relates to a technology enabling a base station to transmit acknowledgement (ACK)/negative ACK (NACK) information about data received from a terminal.

BACKGROUND ART

In a multi-carrier cellular mobile communication system, a terminal may transmit uplink data to a base station. Since a plurality of terminals in a single subframe may transmit uplink data, a base station transmits acknowledgement (ACK)/negative ACK (NACK) information of the uplink data to the plurality of terminals of the single subframe. For example, in a $3^{rd}$ Generation Partnership Project Long Term Evolution (3GPP LTE) system, ACK/NACK information of the uplink data may be referred to as a Hybrid Automatic Repeat-request (HARQ) indicator (HI). Also, a base station may transmit the HI to a plurality of terminals through a Physical Hybrid Automatic Repeat Request Indicator Channel (PHICH).

Also, a terminal may transmit a cyclic-shifted reference signal to a base station. A base station may estimate a wireless channel state of each terminal using the reference signal. Cyclic shift values of reference signals, transmitted by each of the terminals, are to be maximally spaced apart from each other to easily estimate the wireless channel.

A cyclic shift value of each terminal may be associated with a PHICH radio resource of each of the terminals. Accordingly, when the cyclic shift value of each of the terminals is determined based on only being spaced apart, a same PHICH radio resource may be assigned to each of the terminals.

When the same PHICH radio resource is assigned to each of the terminals, each of the terminals may not identify a PHICH radio resource for each of the terminals, and thereby may not receive PHICH information of data transmitted by each of the terminals.

Accordingly, a cyclic shift value of each terminal is to be maximally spaced apart from each other, and a PHICH radio resource is to be assigned to each of the terminals.

DISCLOSURE OF INVENTION

Technical Goals

An aspect of the present invention provides a method of transmitting acknowledgement (ACK)/negative ACK (NACK) information that may cyclic-shift a reference signal based on radio link control information received from a base station.

An aspect of the present invention also provides a method of transmitting ACK/NACK information that may assign a radio resource for a Physical Hybrid Automatic Repeat Request Indicator Channel (PHICH) without collision.

An aspect of the present invention also provides a method of transmitting ACK/NACK information that may maximize a difference in cyclic shift values of terminals and assign a radio resource for a PHICH without collision.

Technical Solutions

According to an aspect of the present invention, there is provided a method of receiving, by a terminal, acknowledgement (ACK)/negative ACK (NACK) information about transmitted data in a wireless communication system, the method including: receiving cyclic shift information for a reference signal from a base station; transmitting, to the base station, the data and a reference signal which is cyclic-shifted using a cyclic shift value which is determined based on the cyclic shift information for the reference signal; and receiving, from the base station, the ACK/NACK information about the transmitted data through a downlink channel which is determined based on the cyclic shift information for the reference signal, wherein the cyclic shift value is determined based on a dynamic cyclic shift value mapped one-to-one to the cyclic shift information for the reference signal, and a radio resource location of the downlink channel is identified based on a modifier mapped one-to-one to the cyclic shift information for the reference signal.

According to another aspect of the present invention, there is provided a method of transmitting, by a base station, ACK/NACK information about data received from a terminal in a wireless communication system, the method including: transmitting cyclic shift information for a reference signal to the terminal; receiving, from the terminal, the data and a reference signal which is cyclic-shifted using a cyclic shift value which is determined based on the cyclic shift information for the reference signal; and transmitting, to the terminal, the ACK/NACK information about the received data through a downlink channel which is determined based on the cyclic shift information for the reference signal, wherein the cyclic shift value is determined based on a dynamic cyclic shift value mapped one-to-one to the cyclic shift information for the reference signal, and a radio resource location of the downlink channel is identified based on a modifier mapped one-to-one to the cyclic shift information for the reference signal.

Advantageous Effects

According to the present invention, a reference signal may be cyclic-shifted based on radio link control information received from a base station.

Also, according to the present invention, a difference in cyclic shift values of terminals may be maximized and a PHICH radio resource may be assigned without collision.

BRIEF DESCRIPTION OF DRAWINGS

FIG. 6 is a flowchart illustrating a data receiving method according to an embodiment of the present invention.

BEST MODE FOR CARRYING OUT THE INVENTION

Figure 1:
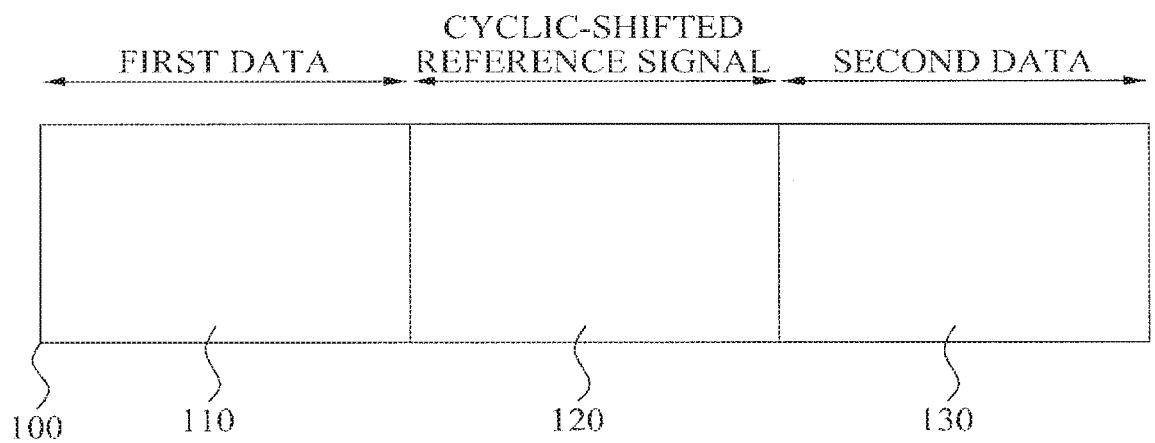
FIG. 1 is a diagram illustrating a configuration of a data frame transmitted by a terminal to a base station according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

In the present invention, a base station may indicate a control device controlling a single cell. In a communication system, a physical base station may actually control a plurality of cells. In this instance, the physical base station may include a plurality of base stations defined in the present invention. That is, a parameter differently assigned to each cell may be recognized that each of the base stations assigns a different value.

In the present invention, a reference signal may be an uplink Demodulation Reference Signal (DMRS) when the present invention is applied to a $3^{rd}$ Generation Partnership Project Long Term Evolution (3GPP LTE) system.

FIG. 1 is a diagram illustrating a configuration of a data frame 100 transmitted by a terminal to a base station according to an embodiment of the present invention. The data frame 100 transmitted by the terminal to the base station may include first data 110 and second data 130. The data frame 100 may also include a reference signal 120.

The reference signal 120 may be a signal agreed to by the terminal and the base station. The base station may have information about a pattern of the reference signal 120 transmitted by the terminal. The base station may estimate a wireless channel between the terminal and the base station using the reference signal 120, and decode the first data 110 and the second data 130 using the estimated wireless channel.

According to an embodiment of the present invention, a plurality of terminals may transmit each data frame to a base station using a same uplink radio resource. However, the present invention may not be limited to the above-described embodiment. In particular, the base station may receive each data frame using a Multi-user Multiple Input Multiple Output (MU-MIMO) scheme. However, the present invention may not be limited to the MU-MIMO scheme. The base station may receive each data frame using a Single User MIMO (SU-MIMO) scheme.

When each of the terminals uses the same reference signal 120, the base station may not distinguish between a plurality of reference signals 120 included in each of the frames using the same uplink radio resource. In this case, a wireless channel for each terminal may not be estimated, and thus the first data 110 and the second data 130 may not be decoded.

The base station may assign different cyclic shift values to each of the terminals to overcome the disadvantage. Each of the terminals may cyclic-shift each of the reference signals 120 based on the assigned cyclic shift value. The base station may divide each of the reference signals 120 using the cyclic shift value of each of the reference signals 120. Accordingly, the base station may estimate the wireless channel of each of the terminals and decode the first data 110 and the second data 130 of each of the terminals using the estimated wireless channel.

Figure 2:
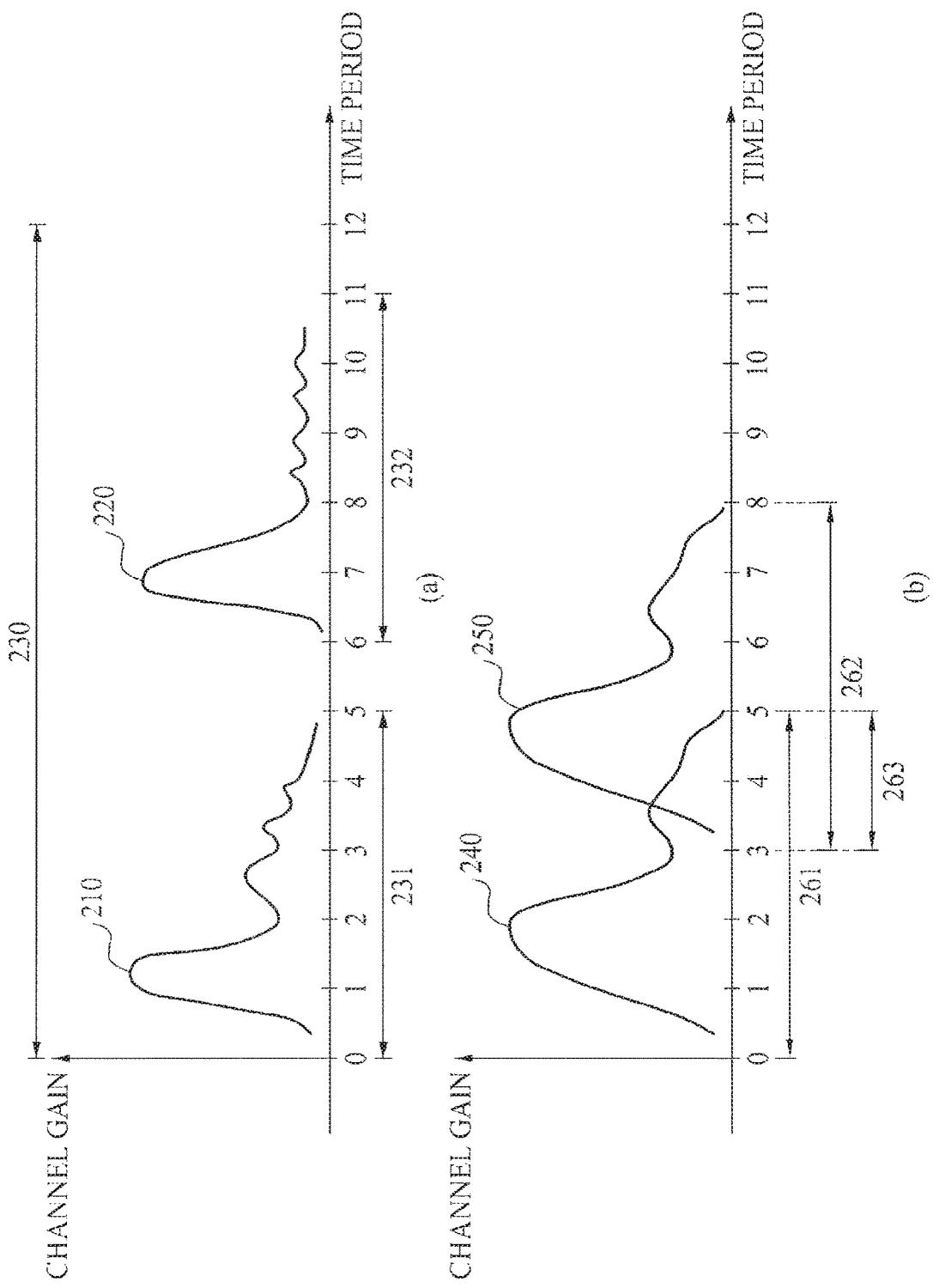
FIG. 2 illustrates graphs associated with a wireless channel estimation using a cyclic-shifted reference signal according to an embodiment of the present invention.

FIG. 2 illustrates graphs associated with a wireless channel estimation using a cyclic-shifted reference signal according to an embodiment of the present invention. Hereinafter, it is described with reference to FIG. 2 that a base station divides each reference signal using the reference signals cyclic-shifted based on different cyclic shift values.

A terminal may cyclic-shift a reference signal in a time domain.

Otherwise, the terminal may phase-shift the reference signal in a frequency domain, and may perform an Inverse Fourier Transform (IFT) with respect to the phase-shifted reference signal. A phase difference of each of the reference signals in the frequency domain may be represented as a time difference of each of the reference signals in the time domain.

That is, a first reference signal received from a first terminal and a second reference signal received from a second terminal may be detected with a time difference.

FIG. 2(a) may indicate a result of estimating a wireless channel of each terminal using each of the reference signals when the first reference signal and the second reference signal are spaced apart from each other.

In FIG. 2, a time duration 230 corresponding to a single data frame may be 12 time intervals.

The base station may estimate a first wireless channel 210 of the first terminal using the first reference signal. Also, the base station may estimate a second wireless channel 220 of the second terminal using the second reference signal.

In FIG. 2(a), a first wireless channel 210 may be in a time interval 231 of a first time interval to a fifth time interval. Also, a second wireless channel 220 may be in a time interval 232 of a seventh time interval to an eleventh time interval. Since the first wireless channel 210 and the second wireless channel 220 are not overlapped and separately located, the first wireless channel 210 and the second wireless channel 220 may be spaced apart from each other.

Since the first wireless channel 210 and the second wireless channel 220 are not overlapped, the base station may accurately estimate the first wireless channel 210 and the second wireless channel 220. The base station may accurately decode data received from the first terminal or the second terminal using the accurately estimated first and second wireless channel 210 and 220.

FIG. 2(b) may indicate a result of estimating a wireless channel of each terminal using each of the reference signals when the first reference signal and the second reference signal are not spaced apart from each other.

In FIG. 2(b), a first wireless channel 240 and a second wireless channel 250 are overlapped in a time interval 263 from a sixth time interval to a tenth time interval. Accordingly, the first wireless channel 240 and the second wireless channel 250 may not be spaced apart from each other. In this case, the base station may not distinguish the first wireless channel 240 from the second wireless channel 250, and may not accurately estimate each of the first wireless channel 240 and the second wireless channel 250. Accordingly, the base station may not accurately decode data received from the first terminal or the second terminal.

Each wireless channel is to be included in the time interval 230 to accurately estimate each of the wireless channels. Also, each of the wireless channels is not to be overlapped, and to be sufficiently spaced apart from each other.

When the base station maximally spaces each of the wireless channels apart from each other, the base station may not accurately know a length, 231, 232, 261, and 262, of each of the wireless channels. Accordingly, a time difference between each of the wireless channels is to be equal. The base station may determine a cyclic shift value of the reference signal of each of the terminals to enable the time difference between each of the wireless channels to be equal.

When each of two terminals transmits a reference signal to a base station as shown in FIG. 2, and the first wireless channel is in the first time interval and the second wireless channel is in the seventh time interval, each of the wireless channels may be maximally spaced apart from each other. Also, when three terminals transmit a reference signal to a base station, a first wireless channel of a first terminal is in a first time interval, a second wireless channel of a second terminal is in a fifth time interval, and a third wireless channel of a third terminal is in a ninth time interval, each of the channels may be maximally spaced apart from each other and a time difference between each of the channels may be equal.

When each of the terminals transmits a reference signal using an Orthogonal Frequency Division Multiplexing (OFDM) scheme, a time interval between each of the reference signals in a time domain may be proportional to a phase interval between each of the reference signals in a frequency domain.

When it is considered that each of the terminals individually converts a phase of each of the reference signals depending on a cyclic shift value, a time difference of each of the wireless channels may be determined based on the cyclic shift value of each of the reference signals. The base station may determine the cyclic shift value of each of the reference signals to enable the time difference of each of the wireless channels to be maximum.

Figure 3:
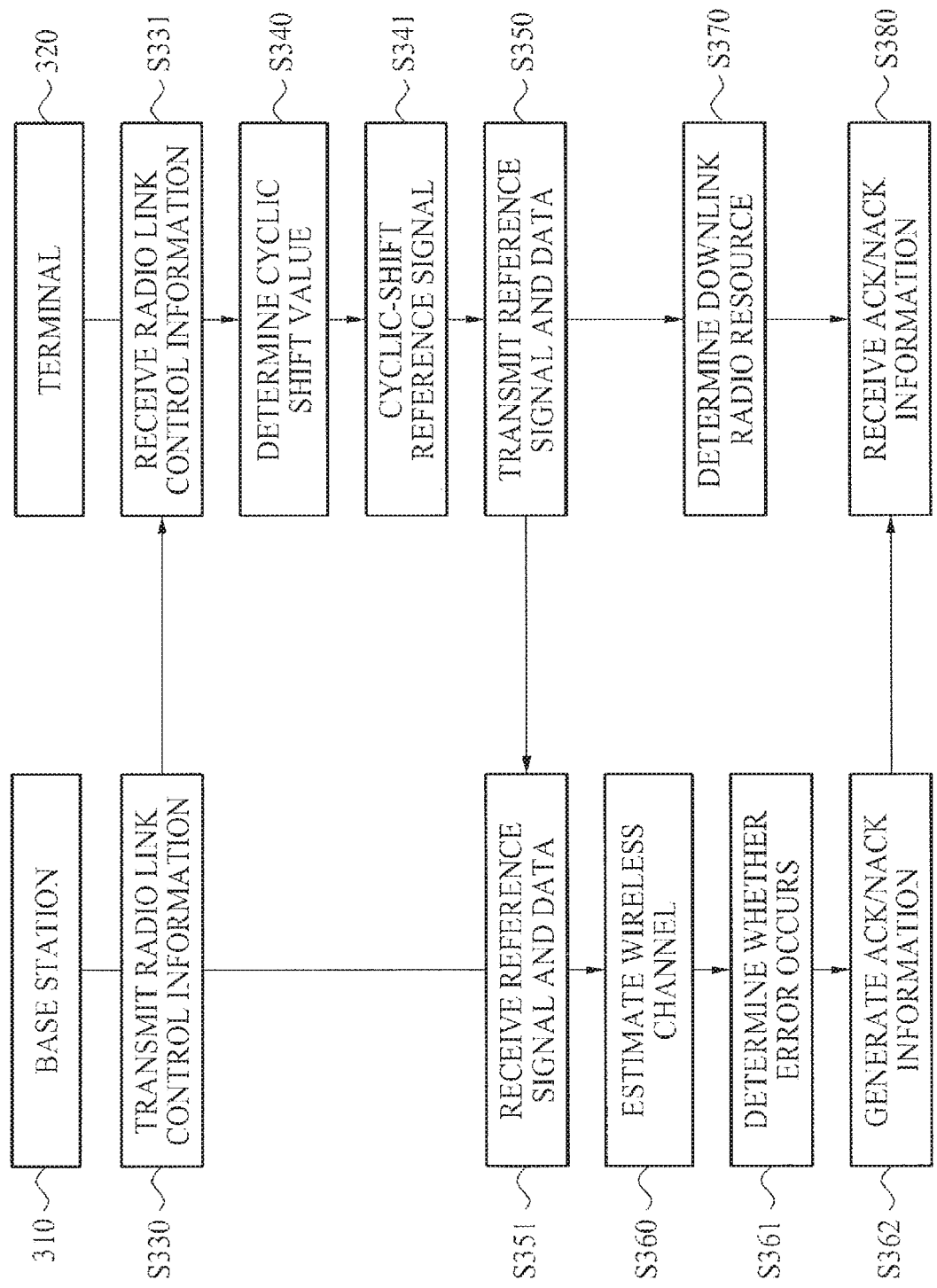
FIG. 3 is a flowchart illustrating an operation of determining a downlink radio resource based on radio link control information according to an embodiment of the present invention.

FIG. 3 is a flowchart illustrating an operation of determining a downlink radio resource based on radio link control information according to an embodiment of the present invention.

In operation S330, a base station 310 may transmit radio link control information to a terminal 320.

When the present invention is applied to a 3GPP LTE system, the radio link control information may be a Downlink Control Information (DCI) format 0. The DCI format 0 may include a plurality pieces of information, required when the terminal 320 transmits data to the base station 310, such as 'cyclic shift information for DMRS field'. The terminal 320 may determine a dynamic cyclic shift value by referring to the cyclic shift information for DMRS field included in the DCI format 0. The DCI format 0 may be transmitted through a Physical Downlink Control Channel (PDCC). When a plurality of terminals transmits data to the base station 310, the base station 310 may transmit the radio link control information determined as different values with respect to each of the terminals.

In operation S331, the terminal 320 may receive the radio link control information from the base station 310.

In operation S340, the terminal 320 may determine a cyclic shift value based on the radio link control information. When the present invention is applied to the 3GPP LTE system, the terminal 320 may determine a dynamic cyclic shift value based on the cyclic shift information for DMRS field included in the DCI format 0. Also, the terminal 320 may combine the dynamic cyclic shift value with other information, received from the base station 310, and thereby may determine the cyclic shift value for a reference signal.

According to an embodiment of the present invention, in operation S340, the terminal 320 may determine the cyclic shift value for the reference signal according to Equation 1.

$$n_{cs} = (n_{DMRS}^{(1)} + n_{DMRS}^{(2)} + n_{PRS}) \bmod 12 \quad \text{[Equation 1]}$$

Here, $n_{cs}$ may denote the cyclic shift value for the reference signal of the terminal 320, and $n_{DMRS}^{(1)}$ may denote a static cyclic shift value. $n_{DMRS}^{(1)}$ may be included in broadcasting information which is equally transmitted to all terminals of a particular cell. A base station corresponding to the particular cell may transmit a same $n_{DMRS}^{(1)}$ to all the terminals of the cell. Terminals included in different cells may receive a different $n_{DMRS}^{(1)}$. $n_{DMRS}^{(2)}$ may denote the dynamic cyclic shift value determined based on the radio link control information received from the base station 310 in operation S331. $n_{PRS}$ may be determined according to Equation 2. When the present invention is applied to the 3GPP LTE system, the radio link control information may be a DCI format 0. An operation S340 where the terminal 320 determines the dynamic cyclic shift value based on the radio link control information received from the base station 310 is described in detail below.

$$n_{PRS} = \sum_{i=0}^{7} c(i) \cdot 2^i \quad \text{[Equation 2]}$$

Here, $c(i)$ may denote a pseudo-random sequence which is equally determined with respect to all the terminals of the base station 310.

The cyclic shift value for the reference signal of the terminal 320 may be determined according to Equation 1 and Equation 2. $n_{DMRS}^{(1)}$ and $n_{PRS}$ may be equally determined with respect to terminals transmitting data to the base station 310. Accordingly, a difference among cyclic shift values of reference signals of the terminals transmitting the data to the base station 310 may be determined based on only $n_{DMRS}^{(2)}$, the dynamic cyclic shift value.

In operation S341, the terminal 320 may cyclic-shift the reference signal based on the determined cyclic shift value. As an example of cyclic shift, the terminal 320 may phase-shift the reference signal in a frequency domain, and perform an IFT to convert the reference signal into a time domain signal. As another example of cyclic shift, the terminal 320 may cyclic-shift the reference signal in the time domain.

In operation S350, the terminal 320 may transmit the cyclic-shifted reference signal to the base station 310 depending on the cyclic shift value. The terminal 320 may transmit first data, second data, and the reference signal to the base station 310 using a data frame shown in FIG. 1. When the present invention is applied to the 3GPP LTE system, the terminal 320 may transmit uplink data to the base station 310 using a Physical Uplink Shared Channel (PUSCH).

In operation S351, the base station 310 may receive the reference signal as well as the first data and the second data from the terminal 320. According to an embodiment of the present invention, a plurality of terminals may transmit data and a reference signal to the base station 310 using a same radio resource. The base station 310 may receive the transmitted data using the same radio resource using the MU-MIMO scheme.

In operation S360, the base station 310 may estimate a wireless channel between the base station 310 and the terminal 320 using the reference signal received from the terminal 320.

In operation S361, the base station 310 may decode the data received from the terminal 320 using the estimated wireless channel. The base station 310 may determine whether an error occurs in the data by referring to a result of the decoding.

In operation S362, the base station 310 may generate acknowledgement (ACK)/negative ACK (NACK) information. When an error does not occur in the data, the ACK information may be generated. When an error occurs in the data, the NACK information may be generated.

In operation S370, the terminal 320 may identify a particular radio resource of a downlink channel where the ACK/NACK information is transmitted. According to an embodiment of the present invention, the terminal 320 may identify the radio resource location of the downlink channel using a modifier. The modifier may be mapped one-to-one to the cyclic shift information for DMRS field. A relationship between the cyclic shift information for DMRS field and the modifier is described in detail using Table 1.

In operation S380, the terminal 320 may receive the ACK/NACK information using the downlink radio resource identified in operation S370.

Hereinafter, the operations are described in greater detail with assumptions that the present invention is applied to the 3GPP LTE system. When the present invention is applied to the 3GPP LTE system, radio link control information may be a DCI format 0, and ACK/NACK information of the uplink data may be a Hybrid Automatic Repeat-request (HARQ) indicator (HI). A downlink channel transmitting the ACK/NACK information may be a Physical Hybrid Automatic Repeat Request Indicator Channel (PHICH).

Radio resources of the PHICH may be included in a PHICH radio resource group and managed. That is, a particular PHICH radio resource may be identified by an index of the PHICH radio resource group and an index of a PHICH radio resource in the PHICH radio resource group.

According to an embodiment of the present invention, in operation S370, the terminal 320 may determine a particular resource of the PHICH based on the DCI format 0 according to Equation 3.

$$n_{PHICH}^{group} = (I_{PRB\_RA}^{lowest\_index} + n_{DMRS}) \bmod N_{PHICH}^{group} + I_{PHICH} \cdot N_{PHICH}^{group})$$

$$n_{PHICH}^{seq} = (\lfloor I_{PRB\_RA}^{lowest\_index} / N_{PHICH}^{group} \rfloor + n_{DMRS}) \bmod (2 \cdot N_{SF}^{PHICH})$$

[Equation 3]

Here, $n_{PHICH}^{group}$ and $I_{PRB\_RA}^{lowest\_index}$ may denote an index of a radio resource group of the PHICH, and a smallest physical resource block index of a first slot where a PUSCH is transmitted, respectively. The PUSCH may be a channel transmitting uplink data corresponding to the HI. $n_{DMRS}$ may denote a modifier, and may be mapped one-to-one to the DCI format 0. $I_{PHICH}^{group}$ may denote a number of radio resource groups of the PHICH. $I_{PHICH}$ may be 1 when a PUSCH transmission is performed in a fifth sub-frame or a tenth sub-frame of a single frame, in a UL/DL configuration of a Time Division Duplex (TDD) scheme. In other cases, $I_{PHICH}$ may be 0.

Also, $n_{PHICH}^{seq}$ may denote an index of a particular PHICH radio resource from among PHICH radio resources included in the radio resource group of the PHICH. $N_{SF}^{PHICH}$ may denote a spreading factor used for PHICH modulation.

Referring to Equation 3, the PHICH radio resource where the ACK/NACK information is transmitted may be determined based on $N_{PHICH}^{group}$ and $n_{PHICH}^{seq}$.

When the plurality of terminals transmits the data to the base station 310 using different uplink radio resources, $I_{PRB\_RA}^{lowest\_index}$ of each of the terminals may be different. Accordingly, the PHICH radio resource may be different.

When the plurality of terminals transmits the data to the base station 310 using a same uplink radio resource, the base station 310 transmits ACK/NACK information of the transmitted data to the plurality of terminals using different PHICH radio resources. That is, the PHICH radio resource for each of the terminals is to be different from each other.

When the plurality of terminals uses the same uplink radio resource, different modifiers, $n_{DMRS}$ may be assigned to each of the terminals from among factors for the PHICH radio resource. Accordingly, the base station 310 may assign the different modifiers, $n_{DMRS}$, to each of the terminals, and thereby may determine the different PHICH radio resources.

According to an embodiment of the present invention, $n_{DMRS}$ may be mapped one-to-one to cyclic shift information for DMRS field included in the DCI format 0 as shown in Table 1.

TABLE 1

| cyclic shift information for DMRS field | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

Also, in operation S340, the terminal 320 may determine the dynamic cyclic shift value based on the DCI format 0 received from the base station 310, and determine the cyclic shift value for the reference signal based on the dynamic cyclic shift value.

Referring to Equation 1, the base station 310 may assign different dynamic cyclic shift values to each of the terminals, and thus the cyclic shift value of each of the terminals may be different from each other.

According to an embodiment of the present invention, a dynamic cyclic shift value, $n_{DMRS}^{(2)}$ may be mapped one-to-one to the cyclic shift information for DMRS field included in the DCI format 0 as shown in Table 2. The cyclic shift information for DMRS field included in the DCI format 0 of Table 2 may be received from the base station 310.

TABLE 2

| cyclic shift information for DMRS field | $n_{DMRS}$ | $n_{DMRS}^{(2)}$ |
|---|---|---|
| 000 | 0 | 0 |
| 001 | 1 | 2 |
| 010 | 2 | 3 |
| 011 | 3 | 4 |
| 100 | 4 | 6 |
| 101 | 5 | 8 |

TABLE 2-continued

| cyclic shift information for DMRS field | $n_{DMRS}$ | $n_{DMRS}^{(2)}$ |
|---|---|---|
| 110 | 6 | 9 |
| 111 | 7 | 10 |

The dynamic cyclic shift value, $n_{DMRS}^{(2)}$, and the modifier, $n_{DMRS}$, are shown in Table 2.

Referring to Table 2, the dynamic cyclic shift value, $n_{DMRS}^{(2)}$ may be associated with the modifier, $n_{DMRS}$, based on the DCI format 0. Accordingly, when a base station assigns the dynamic cyclic shift value, $n_{DMRS}^{(2)}$, to enable a wireless channel between the base station and a terminal to be easily estimated, the modifier, $n_{DMRS}$, may be affected. Accordingly, a collision between the PHICH radio resources where the terminal receives the ACK/NACK information may occur.

Hereinafter, an example where a collision among PHICH radio resources for a plurality of terminals occurs when the dynamic cyclic shift value, $n_{DMRS}^{(2)}$, is determined by referring to Table 2 is described.

Referring to Equation 3, a PHICH radio resource may be determined using a modulo operation.

When the plurality of terminals transmits data using an extended cyclic prefix, $2 \cdot N_{SF}^{PHICH}$ may be four. Also, $N_{PHICH}^{group}$ may be four. In this instance, a radio resource group and a radio resource sequence may be obtained based on a 'modulo four operation'. Accordingly, when a difference in a modifier, $n_{DMRS}$, determined with respect to each of the terminals is a multiple of four, a same PHICH radio resource may be assigned to each of the terminals.

It may be assumed that radio link control information is assigned to a plurality of terminals by referring to Table 2. Also, it may be assumed that a time interval corresponding to a single data frame is divided into 12 time intervals. By referring to the description that a wireless channel of each of the terminals is to be maximally spaced apart from each other, described with reference to FIG. 2, when two terminals transmit data to a base station, {0, 6} may be assigned as a dynamic cyclic shift value $n_{DMRS}^{(2)}$ to each of the two terminals. In this case, the base station may determine {000, 100} as cyclic shift information for DMRS field included in the DCI format 0 with respect to each of the terminals, and $n_{DMRS}$ may be determined as {0, 4}. Referring to Equation 3, a same PHICH radio resource may be assigned to each of the terminals. Accordingly, each of the terminals may not receive ACK/NACK information using the PHICH.

When four terminals transmit data to a base station, the base station may assign {0, 3, 6, 9} as a dynamic cyclic shift value $n_{DMRS}^{(2)}$ to each of the four terminals. In this case, the base station may determine {000, 010, 100, 110} as cyclic shift information for DMRS field included in the DCI format 0 with respect to each of the terminals. A modifier, $n_{DMRS}$, may be determined as {0, 2, 4, 6}. Referring to Equation 3, a PHICH radio resource of a terminal where the modifier, $n_{DMRS}$, is 0, may collide with a PHICH radio resource of a terminal where the modifier, $n_{DMRS}$, is 4. Also, a PHICH radio resource of a terminal where the modifier, $n_{DMRS}$, is 2, may collide with a PHICH radio resource of a terminal where the modifier, $n_{DMRS}$, is 6.

When a corresponding relationship between cyclic shift information for DMRS field included in the DCI format 0 and the dynamic cyclic shift value $n_{DMRS}^{(2)}$ is improved, the collision may be prevented. Table 3 shows a mapping relationship between improved cyclic shift information and the dynamic cyclic shift value $n_{DMRS}^{(2)}$.

TABLE 3

| cyclic shift information | $n_{DMRS}$ | $n_{DMRS}^{(2)}$ |
|---|---|---|
| 000 | 0 | 0 |
| 001 | 1 | 6 |
| 010 | 2 | 3 |
| 011 | 3 | 4 |
| 100 | 4 | 2 |
| 101 | 5 | 8 |
| 110 | 6 | 10 |
| 111 | 7 | 9 |

It may be assumed that two terminals transmit data and a reference signal by referring to Table 3. The base station may assign {0, 6} as a dynamic cyclic shift value $n_{DMRS}^{(2)}$ to each of the two terminals. In this case, the base station may determine {000, 001} as cyclic shift information with respect to each of the terminals. A modifier, $n_{DMRS}$, may be determined as {0, 1}. Each of the terminals may use different PHICH radio resources, and receive ACK/NACK information.

It may be assumed that three terminals transmit a reference signal by referring to Table 3. The base station may assign {0, 4, 8} as a dynamic cyclic shift value $n_{DMRS}^{(2)}$ to each of the three terminals. In this case, the base station may determine {000, 011, 101} as cyclic shift information with respect to each of the terminals. A modifier, $n_{DMRS}$, may be determined as {0, 3, 5}. When the modifier, $n_{DMRS}$, is divided by four, remainders may be {0, 3, 1}. Accordingly, different PHICH radio resources may be determined for each of the terminals. Since a collision among the PHICH radio resources does not occur, each of the terminals may receive ACK/NACK information.

It may be assumed that four terminals transmit a reference signal by referring to Table 3. The base station may assign {0, 3, 6, 9} as a dynamic cyclic shift value $n_{DMRS}^{(2)}$ to each of the four terminals. In this case, a modifier, $n_{DMRS}$ may be determined as {0, 2, 1, 7}. When the modifier, $n_{DMRS}$ is divided by four, remainders may be {0, 2, 1, 3}. Accordingly, different PHICH radio resources may be determined for each of the terminals, even when the four terminals transmit data to the base station.

The examples where the terminal identifies the PHICH radio resource by referring to Table 3 has been described above. However, when the terminal identifies the PHICH radio resource by referring to Table 4, PHICH radio resources that do not collide with each other may be assigned to each terminal similar to Table 3.

TABLE 4

| cyclic shift information | $n_{DMRS}$ | $n_{DMRS}^{(2)}$ |
|---|---|---|
| 000 | 0 | 0 |
| 001 | 1 | 6 |
| 010 | 2 | 4 |
| 011 | 3 | 3 |
| 100 | 4 | 2 |
| 101 | 5 | 8 |
| 110 | 6 | 9 |
| 111 | 7 | 10 |

Figure 4:
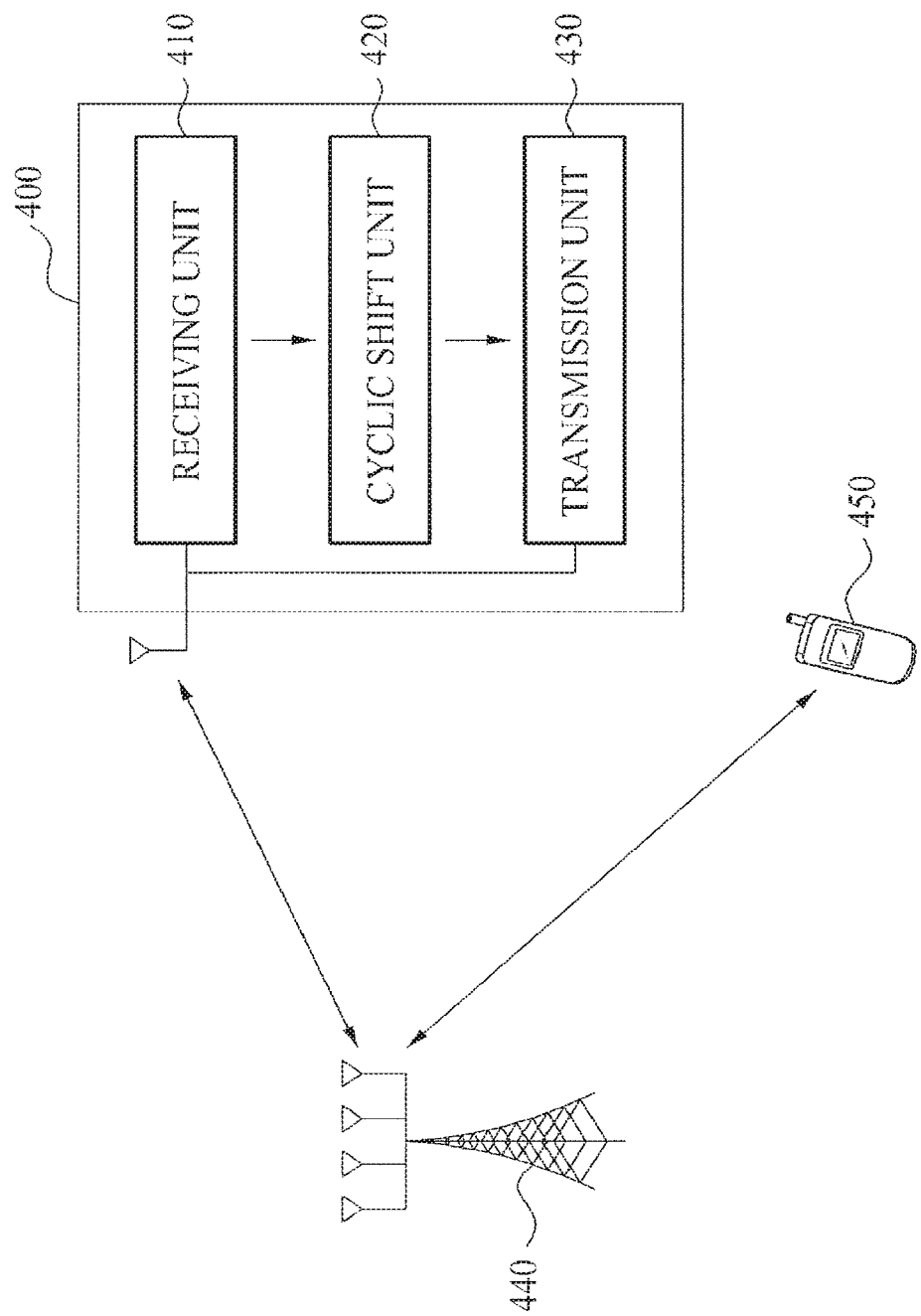
FIG. 4 is a diagram illustrating a configuration of a terminal according to an embodiment of the present invention.

FIG. 4 is a diagram illustrating a configuration of a terminal 400 according to an embodiment of the present invention. The terminal 400 may include a receiving unit 410, a cyclic shift unit 420, and a transmission unit 430.

The receiving unit 410 may receive radio link control information from a base station 440. The cyclic shift unit 420 may determine a dynamic cyclic shift value based on the received radio link control information. The radio link control information may include cyclic shift information for a reference signal. When the present invention is applied to a 3GPP LTE system, the radio link control information may be the DCI format 0, and the cyclic shift information may be cyclic shift information for DMRS field included in the DCI format 0. According to an embodiment of the present invention, the cyclic shift unit 420 may map the dynamic cyclic shift value and the cyclic shift information for DMRS field included in the DCI format 0 by referring to Table 3 or Table 4.

According to an embodiment of the present invention, the receiving unit 410 may receive a static cyclic shift value broadcasted from the base station 440. The static cyclic shift value may be equally determined with respect to all terminals 400 and 450 transmitting data to the base station 440. Conversely, the dynamic cyclic shift value may not be equally determined with respect to all the terminals 400 and 450.

The cyclic shift unit 420 may determine the cyclic shift value based on a pseudo-random sequence uniquely determined based on the base station 440 and a value obtained by summing the static cyclic shift value and the dynamic cyclic shift value.

The cyclic shift unit 420 may cyclic-shift a reference signal in proportion to the cyclic shift value. As an example of the cyclic shift, the cyclic shift unit 420 may phase-shift the reference signal in a frequency domain, and perform an IFT to convert the reference signal into a time domain signal. As another example of cyclic shift, the cyclic shift unit 420 may cyclic-shift the reference signal in the time domain.

The transmission unit 430 may transmit the cyclic shifted reference signal to the base station 440. According to an embodiment of the present invention, the receiving unit 410 may receive information about an uplink radio resource and the transmission unit 430 may transmit the cyclic-shifted reference signal and data to the base station 440 using the uplink radio resource.

According to an embodiment of the present invention, the base station 440 may assign a same uplink radio resource to the terminals 400 and 450 transmitting the data to the base station 440. In this case, the base station 440 may receive the transmitted data using an MU-MIMO scheme.

The base station 440 may assign different dynamic cyclic shift values to the terminals 400 and 450. Accordingly, a cyclic shift value of each of the terminals 400 and 450 may be different from each other. The base station 440 may assign the different dynamic cyclic shift values to each of the terminals 400 and 450, and thereby may distinguish the reference signal received from each of the terminals 400 and 450.

The base station 440 may estimate a wireless channel between the base station 440 and each of the terminals 400 and 450. The base station 440 may decode the data, received from each of the terminals 400 and 450, based on a result of the decoding.

The receiving unit 410 may receive ACK/NACK information of the data transmitted by the transmission unit 430. Although the uplink radio resource transmitting the data may be equally assigned to the terminals 400 and 450, a downlink radio resource receiving the ACK/NACK information may be differently determined based on each of the terminals 400 and 450.

When the present invention is applied to a 3GPP LTE system, the ACK/NACK information of uplink data may be an HI. A downlink channel transmitting the ACK/NACK information may be a PHICH. Transmission from the base station 440 to each of the terminals 400 and 450 may be performed through the PHICH, and a radio resource of a downlink channel may be determined based on cyclic shift information for DMRS field included in the DCI format 0. The receiving unit 410 may determine a modifier $n_{DMRS}$ based on the cyclic shift information for DMRS field included in the DCI format 0. An example of a mapping relationship between the cyclic shift information and the modifier $n_{DMRS}$ is shown in Table 1.

The receiving unit 410 may receive the ACK/NACK information, transmitted to the base station 440, using the downlink radio resource according to Equation 3.

Figure 5:
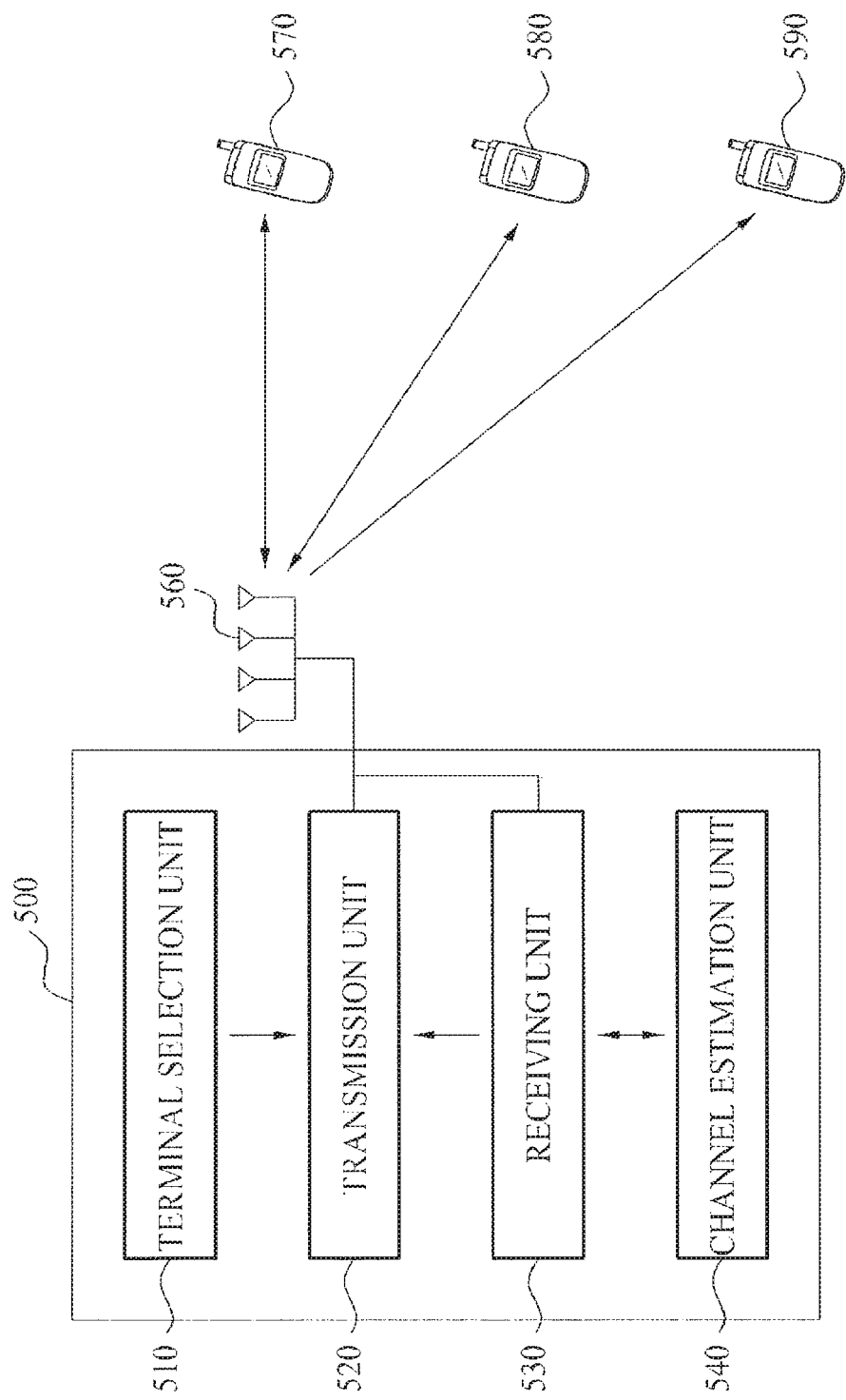
FIG. 5 is a diagram illustrating a configuration of a base station according to an embodiment of the present invention.

FIG. 5 is a diagram illustrating a configuration of a base station 500 according to an embodiment of the present invention. The base station 500 may include a terminal selection unit 510, a transmission unit 520, a receiving unit 530, and a channel estimation unit 540.

The terminal selection unit 510 may select a plurality of terminals 570, 580, and 590 to transmit data to the base station 500 from a plurality of terminals located in a coverage of the base station 500. Hereinafter, it may be assumed that a first terminal 570 and a second terminal 580 are selected as the terminal to transmit the data.

The transmission unit 520 may determine radio link control information of each of the terminals 570 and 580 based on a number of selected terminals. The radio link control information may include cyclic shift information for a reference signal. When the same uplink radio resource is assigned to each of the terminals 570 and 580, the transmission unit 520 may determine the cyclic shift information for each of the terminals 570 and 580 to enable a time difference among the reference signals, transmitted by the terminals 570 and 580, to be maximum and equal. The transmission unit 520 may transmit the determined cyclic shift information to each of the terminals 570 and 580.

Each of the terminals 570 and 580 may determine a dynamic cyclic shift value based on the cyclic shift information. According to an embodiment of the present invention, each of the terminals 570 and 580 may determine a dynamic cyclic shift value by referring to Table 3 and Table 4.

Each of the terminals 570 and 580 may determine a cyclic shift value based on the dynamic cyclic shift value, determined to be different for each of the terminals 570 and 580, and broadcasting information equally determined with respect to each of the terminals 570 and 580. Also, each of the terminals 570 and 580 may cyclic-shift a reference signal using the cyclic shift value.

The receiving unit 530 may receive the cyclic-shifted reference signal and data from each of the terminals 570 and 580. The transmission unit 520 may equally determine an uplink radio resource with respect to each of the terminals 570 and 580 by referring to the cyclic shift information. The transmission unit 520 may transmit the radio link control information including information about an uplink radio resource. Each of the terminals 570 and 580 may transmit the data and the reference signal using the same uplink radio resource. The receiving unit 530 may receive the data using an MU-MIMO scheme.

The channel estimation unit 540 may estimate a wireless channel between the base station 500 and each of the terminals 570 and 580 based on the cyclic-shifted reference signal. The receiving unit 530 may decode the data based on a result of the estimating.

The receiving unit 530 may determine whether an error occurs in the decoded data. When the error occurs, the receiving unit 530 may determine that the data transmission fails. The transmission unit 520 may transmit ACK/NACK information to each of the terminals 570 and 580 using a downlink channel.

The transmission unit 520 may determine a radio resource of the downlink channel based on the radio link control information, and transmit ACK/NACK information using the determined radio resource of the downlink channel.

When the present invention is applied to a 3GPP LTE system, the radio link control information may be the DCI format 0, the cyclic shift information may be cyclic shift information for DMRS field included in the DCI format 0, and the ACK/NACK information of uplink data may be an HI. Also, the downlink channel transmitting the ACK/NACK information may be a PHICH. In this case, the transmission unit 520 may determine a modifier $n_{DMRS}$ AIRS by referring to Table 1.

The transmission unit 520 may determine a PHICH radio resource according to Equation 3, and transmit the ACK/NACK information to each of the terminals 570 and 580 using the determined PHICH radio resource.

FIG. 6 is a flowchart illustrating a data receiving method according to an embodiment of the present invention.

In operation S610, a terminal may receive radio link control information from a base station. The radio link control information may include cyclic shift information for a reference signal. The terminal may determine a dynamic cyclic shift value based on the radio link control information received from the base station. When the present invention is applied to a 3GPP LTE system, the radio link control information may be a DCI format 0, and the cyclic shift information may be cyclic shift information for DMRS field included in the DCI format 0. The terminal may receive the DCI format 0 from the base station, and determine the dynamic cyclic shift value $n_{DMRS}^{(2)}$. The terminal may determine the dynamic cyclic shift value by referring to Table 3 and Table 4.

In operation S620, the terminal may determine a cyclic shift value based on the dynamic cyclic shift value and broadcasting information transmitted from the base station. The broadcasting information may be equally determined for all terminals of a particular cell, and a static cyclic shift value may be the broadcasting information. The dynamic cyclic shift value may be differently determined with respect to each terminal transmitting the data to the base station. However, the broadcasting information may be equally determined for all the terminals of the cell.

In operation S630, the terminal may cyclic-shift a reference signal using the determined cyclic shift value. According to an embodiment of the present invention, the terminal may shift a phase of the reference signal by a phase shift value in a frequency domain. The phase shift value may correspond to the cyclic shift value. According to another embodiment of the present invention, the terminal may cyclic-shift a time of the reference signal by the cyclic shift value. The time corresponding to the cyclic shift value may be a value obtained by multiplying a remainder with a value. Here, the remainder may be a remainder when the cyclic shift value is divided by 12, and the value may be obtained by dividing a time when the reference signal is transmitted by 12.

In operation S640, the terminal may determine the uplink radio resource based on the radio link control information. According to an embodiment of the present invention, a same radio link control information may be assigned to a plurality of terminals transmitting data to a same base station.

In operation S650, the terminal may transmit the cyclic-shifted reference signal and the data to the base station. When the same radio link control information is assigned to each of the terminals in operation S640, the terminals may transmit the reference signal and the data to the base station using the same radio link control information. Although a plurality of reference signals is transmitted using the same radio link control information, the base station may identify each of the reference signals because a cyclic shift value of each of the reference signals are assigned differenctly. The base station may estimate a wireless channel state between the terminal and the base station using the reference signals and decode the data based on a result of the decoding.

When an error does not occur in the data, the base station may determine that the data transmission is successful.

In operation S660, the terminal may receive ACK/NACK information of the data. When a plurality of terminals transmits the data to the base station, the base station may transmit the ACK/NACK information to each of the terminals using different downlink radio resources.

According to an embodiment of the present invention, the downlink radio resource may be identified based on the cyclic shift information for DMRS field included in the DCI format 0, included in the radio link control information. Since it has been described above with reference to FIG. 3 that a downlink radio resource is identified based on the cyclic shift information for DMRS field included in the DCI format 0, further detailed description is omitted.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A communication method performed by an e-Node B (eNB), the method comprising:
causing the eNB to transmit cyclic shift information for reference signal to a user equipment (UE);
causing the eNB to receive data and a reference signal using one or more uplink radio resources; and
causing the eNB to transmit an acknowledgement for the transmitted data using a Physical Hybrid ARQ Indicator Channel (PHICH) resource,
wherein the received reference signal is cyclically shifted at least based on a dynamic cyclic shift value,
the dynamic cyclic shift value is determined at least based on the cyclic shift information for reference signal according to Table 1, and
the PHICH resource is determined at least based on the cyclic shift information for reference signal

TABLE 1

| cyclic shift information for reference signal | dynamic cyclic shift value |
| --- | --- |
| 000 | 0 |
| 001 | 6 |
| 010 | 3 |
| 011 | 4 |
| 100 | 2 |
| 101 | 8 |
| 110 | 10 |
| 111 | 9. |

2. The method of claim 1, wherein the PHICH resource is determined at least based on an identifier, and the identifier is determined at least based on the cyclic shift information for reference signal according to Table 2

TABLE 2

| cyclic shift information for reference signal | Identifier |
| --- | --- |
| 000 | 0 |
| 001 | 1 |
| 010 | 2 |
| 011 | 3 |
| 100 | 4 |
| 101 | 5 |
| 110 | 6 |
| 111 | 7. |

3. The method of claim 2, wherein at least one modulo-four operation is performed in determining the PHICH resource.

4. The method of claim 2, wherein a mapping according to Table 2 prevents collision of downlink radio sources obtained based on a modulo-four operation.

5. The method of claim 1, wherein the reference signal is a Demodulation Reference signal (DMRS).

6. The method of claim 1, wherein the cyclic shift information for reference signal is transmitted by DCI (Downlink Control Information) format 0.

7. A communication apparatus, comprising:
a circuitry which is configured to:
cause the apparatus to transmit cyclic shift information for reference signal to a user equipment (UE);
cause the apparatus to receive data and a reference signal using one or more uplink radio resources; and
cause the apparatus to transmit an acknowledgement for the transmitted data using a Physical Hybrid ARQ Indicator Channel (PHICH) resource,
wherein the received reference signal is cyclically shifted at least based on a dynamic cyclic shift value,
the dynamic cyclic shift value is determined at least based on the cyclic shift information for reference signal according to Table 3, and
the PHICH resource is determined at least based on the cyclic shift information for reference signal

TABLE 3

| cyclic shift information for reference signal | dynamic cyclic shift value |
| --- | --- |
| 000 | 0 |
| 001 | 6 |
| 010 | 3 |
| 011 | 4 |
| 100 | 2 |
| 101 | 8 |
| 110 | 10 |
| 111 | 9. |

8. The apparatus of claim 7, wherein the PHICH resource is determined at least based on an identifier, and the identifier is determined at least based on the cyclic shift information for reference signal according to Table 4

TABLE 4

| cyclic shift information for reference signal | Identifier |
| --- | --- |
| 000 | 0 |
| 001 | 1 |
| 010 | 2 |
| 011 | 3 |
| 100 | 4 |
| 101 | 5 |
| 110 | 6 |
| 111 | 7. |

9. The apparatus of claim 8, wherein at least one modulo-four operation is performed in determining the PHICH resource.

10. The apparatus of claim 8, wherein a mapping according to Table 4 prevents collision of downlink radio sources obtained based on a modulo-four operation.

11. The apparatus of claim 7, wherein the reference signal is a Demodulation Reference signal (DMRS).

12. The apparatus of claim 7, wherein the cyclic shift information for reference signal is transmitted by DCI (Downlink Control Information) format 0.

13. A device for an e-Node B (eNB), comprising:
a circuitry which is configured to:
cause the eNB to transmit cyclic shift information for reference signal to a user equipment (UE);
cause the eNB to receive data and a reference signal using one or more uplink radio resources; and
cause the eNB to transmit an acknowledgement for the transmitted data using a Physical Hybrid ARQ Indicator Channel (PHICH) resource,
wherein the received reference signal is cyclically shifted at least based on a dynamic cyclic shift value,
the dynamic cyclic shift value is determined at least based on the cyclic shift information for reference signal according to Table 5, and
the PHICH resource is determined at least based on the cyclic shift information for reference signal

TABLE 5

| cyclic shift information for reference signal | dynamic cyclic shift value |
|---|---|
| 000 | 0 |
| 001 | 6 |
| 010 | 3 |
| 011 | 4 |
| 100 | 2 |
| 101 | 8 |
| 110 | 10 |
| 111 | 9. |

14. The apparatus of claim 13, wherein the PHICH resource is determined at least based on an identifier, and the identifier is determined at least based on the cyclic shift information for reference signal according to Table 6

TABLE 6

| cyclic shift information for reference signal | Identifier |
|---|---|
| 000 | 0 |
| 001 | 1 |

TABLE 6-continued

| cyclic shift information for reference signal | Identifier |
|---|---|
| 010 | 2 |
| 011 | 3 |
| 100 | 4 |
| 101 | 5 |
| 110 | 6 |
| 111 | 7. |

15. The apparatus of claim 14, wherein at least one modulo-four operation is performed in determining the PHICH resource.

16. The apparatus of claim 14, wherein a mapping according to Table 6 prevents collision of downlink radio sources obtained based on a modulo-four operation.

17. The apparatus of claim 13, wherein the reference signal is a Demodulation Reference signal (DMRS).

18. The apparatus of claim 13, wherein the cyclic shift information for reference signal is transmitted by DCI (Downlink Control Information) format 0.

* * * * *